INVENTOR.
GEORGE M. WALTON

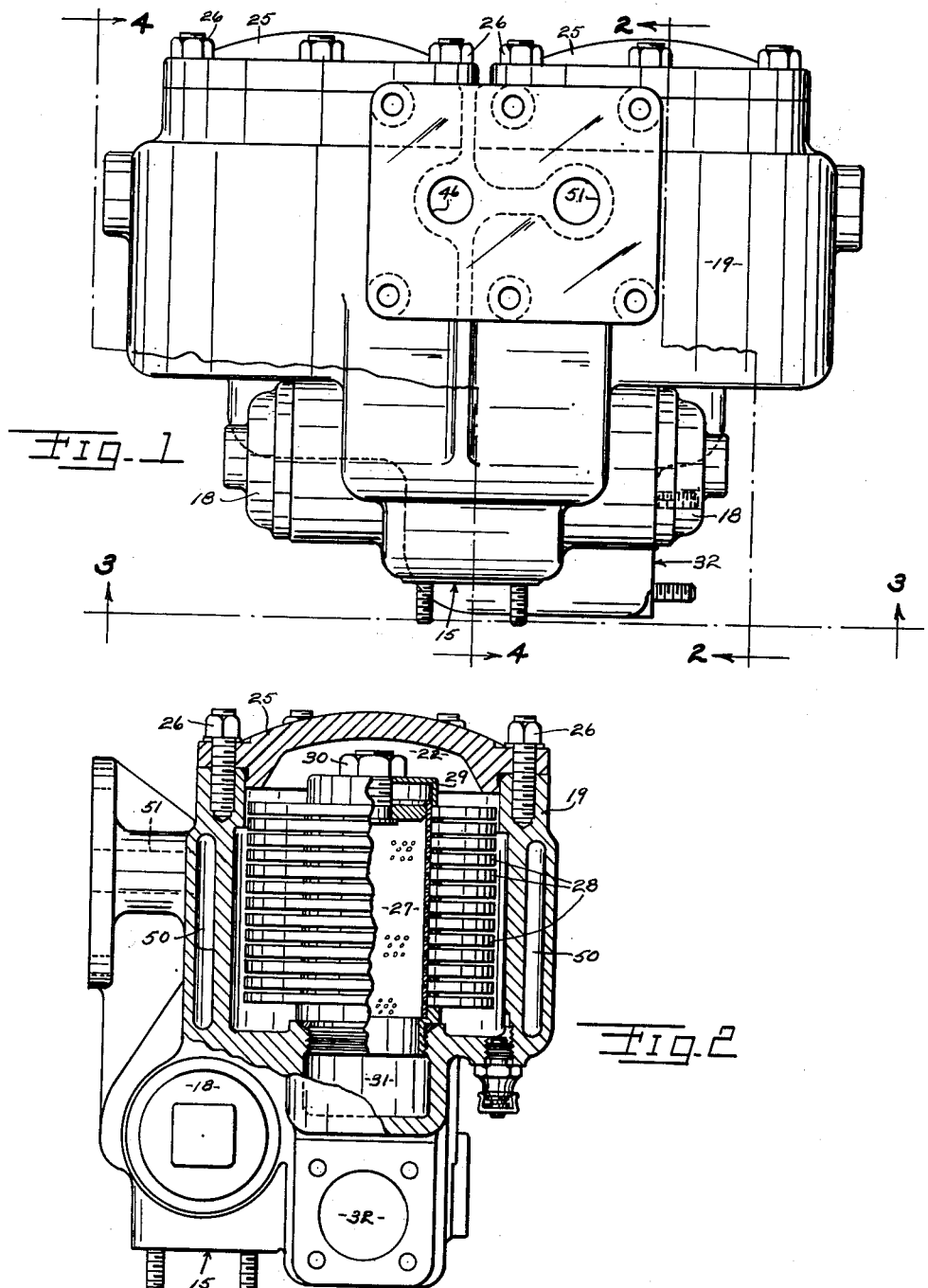

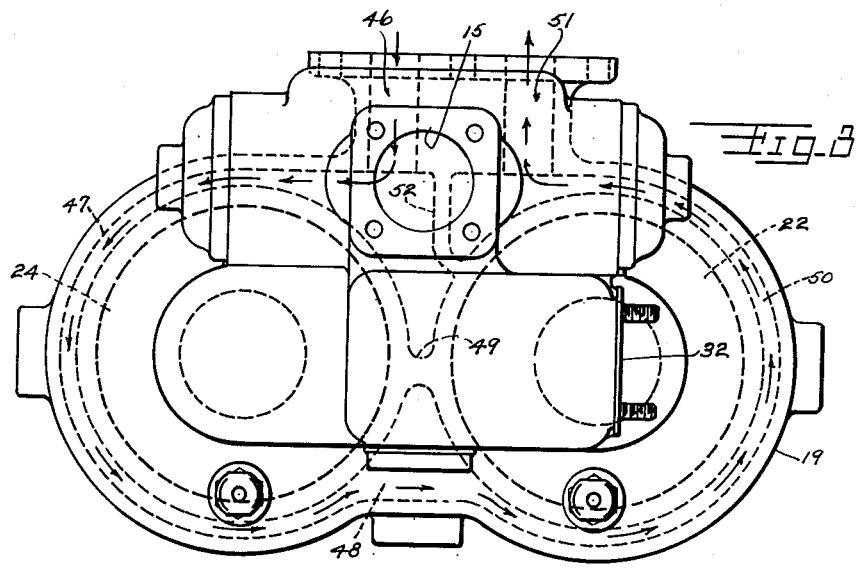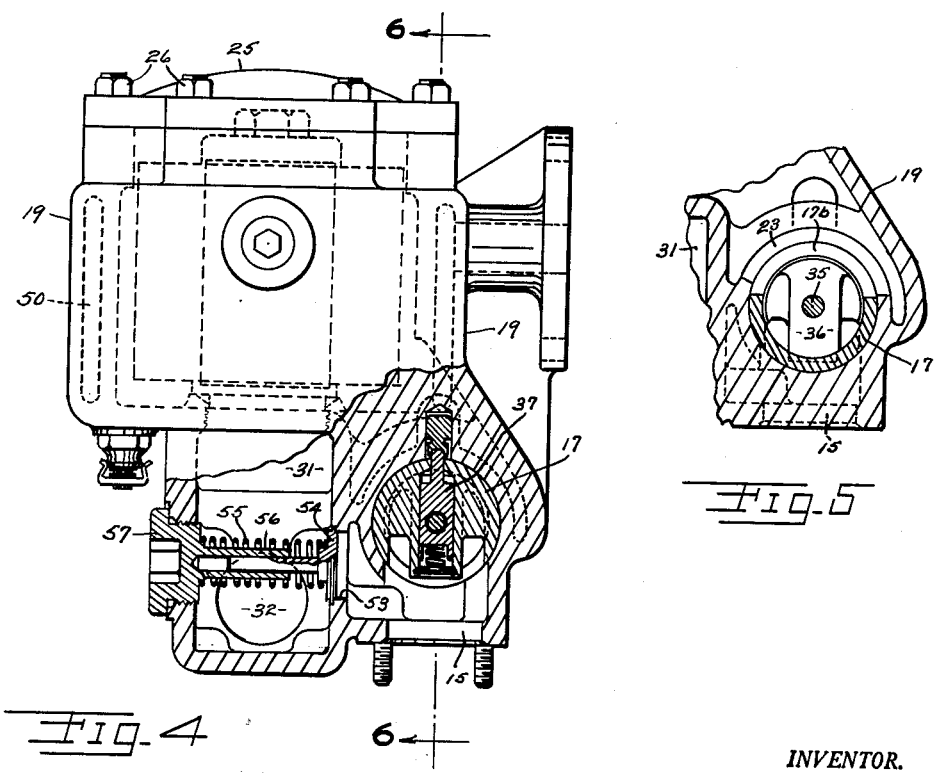

May 25, 1954 — G. M. WALTON — 2,679,320
DUAL FILTER WITH PRESSURE DIFFERENTIAL SELECTOR VALVE
Filed Dec. 1, 1951 — 4 Sheets-Sheet 4
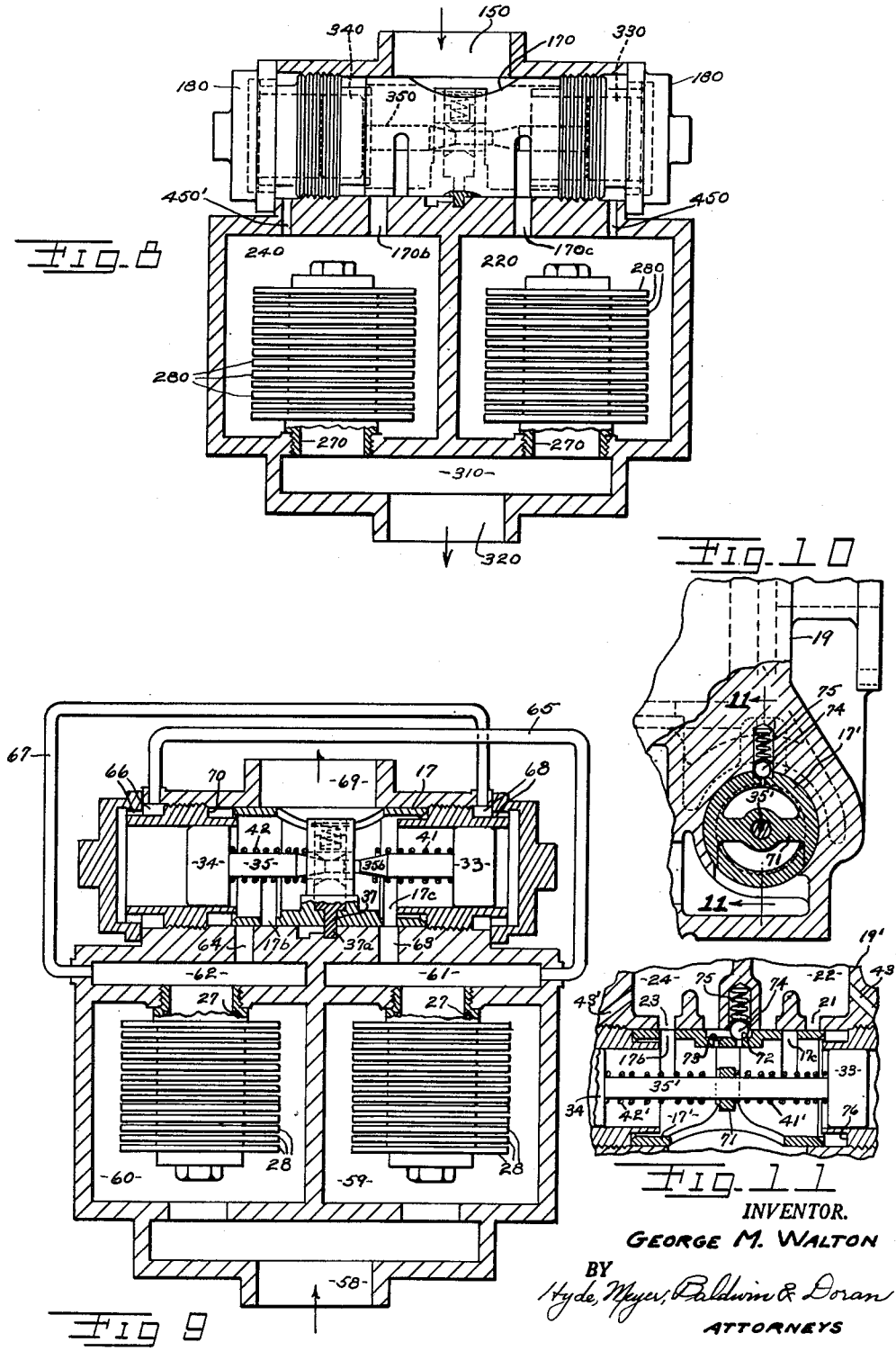
INVENTOR.
GEORGE M. WALTON
BY Hyde, Meyer, Baldwin & Doran
ATTORNEYS Patented May 25, 1954

2,679,320

UNITED STATES PATENT OFFICE 2,679,320

DUAL FILTER WITH PRESSURE DIFFERENTIAL SELECTOR VALVE

George M. Walton, Cleveland, Ohio, assignor to Air-Maze Corporation, Cleveland, Ohio, a corporation of Delaware Application December 1, 1951, Serial No. 259,349

3 Claims. (Cl. 210—168)

This invention relates to improvements in a dual filter with a pressure differential selector valve for changing the fluid flow from a first fluid filter to a second fluid filter when the first filter becomes sufficiently clogged.

One of the objects of the present invention is to provide a device of the type described which is completely automatic wherein valve means is provided to close a port controlling the flow through a dirty filter chamber and to open a port permitting flow through a clean filter chamber, together with differential means operatively associated with the valve means to cause this shifting when the dirty filter has become clogged by a predetermined amount.

Another object of the present invention is to provide a snap action means for moving the valve over center so that it moves from one valve position to another with a quick snap action.

Another object of the present invention is to provide a detent for holding the valve in one of its positions together with positive means for releasing the detent by preliminary movement of the differential pressure means.

Still another object of the present invention is to provide a sleeve valve for shifting the flow from one filter chamber to the other together with a differential pressure device comprising two pistons lying respectively at opposite ends of the sleeve valve with a piston rod connecting them. A spring is then provided between each piston and the sleeve valve and arranged in such a way that preliminary movement of the piston serves to load the spring, after which detent means is released and the spring snaps the valve to the other of its two positions.

A further object of the present invention is the utilization of the pressure in the closed filter chamber as a source for the differential pressure for moving the valve means so that a very compact arrangement results.

Other objects and advantages of the invention will be apparent from the accompanying drawings and description and the essential features will be set forth in the appended claims.

In the drawings,

Fig. 1 is a side elevational view of one embodiment of the invention;

Fig. 2 is a view partly in section taken along the line 2—2 of Fig. 1;

Fig. 3 is a bottom plan view of the device of Fig. 1 taken substantially from the position of the line 3—3 of Fig. 1;

Fig. 4 is a view partly in end elevation and partly in section taken along the line 4—4 of Fig. 1;

Fig. 5 is a fragmental sectional view taken along the line 5—5 of Fig. 7;

Fig. 8 is a somewhat diagrammatic view illustrating some of the principles utilized in the control of the device of Figs. 1-7 inclusive;

Fig. 9 is a diagrammatic view through a modified form of the invention wherein the direction of fluid flow is reversed over that direction shown in Fig. 8;

Fig. 10 is a fragmental sectional view through a modification this view being taken at approximately the same position as the lower right hand portion of Fig. 6; while Fig. 11 is a fragmental sectional view taken along the line 11—11 of Fig. 10.

Without in any way restricting the field of use of this invention, it may be stated that one use thereof is in the fuel line supplying liquid fuel to an airplane engine. Such liquid fuel must be filtered, and one of the problems involved in flight at high altitudes, is the formation of ice crystals in the fuel. These crystals clog the filter elements long before they are clogged with dirt sufficiently to almost completely shut off fuel flow to the engine unless the problem is solved. The present invention, therefore, is directed to this problem and provides two filters in side by side relationship so that when the ice crystals clog one of the filter elements, that filter element is cut off the line and the other filter element is placed in the line so that fuel may flow uninterruptedly to the engine.

Figure 6:
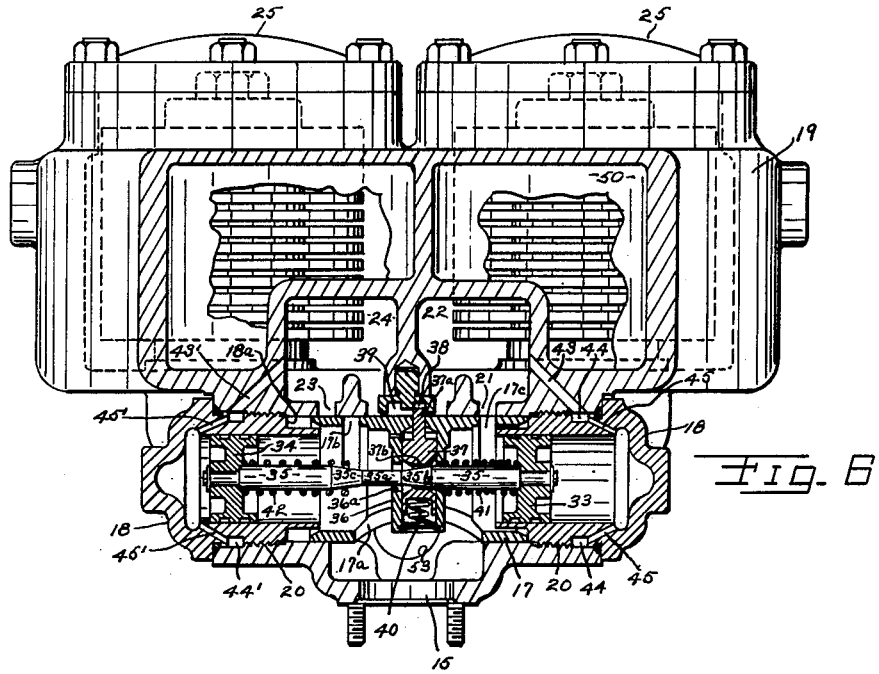
Fig. 6 is a transverse sectional view taken along the line 6—6 of Fig. 4.
Figure 7:
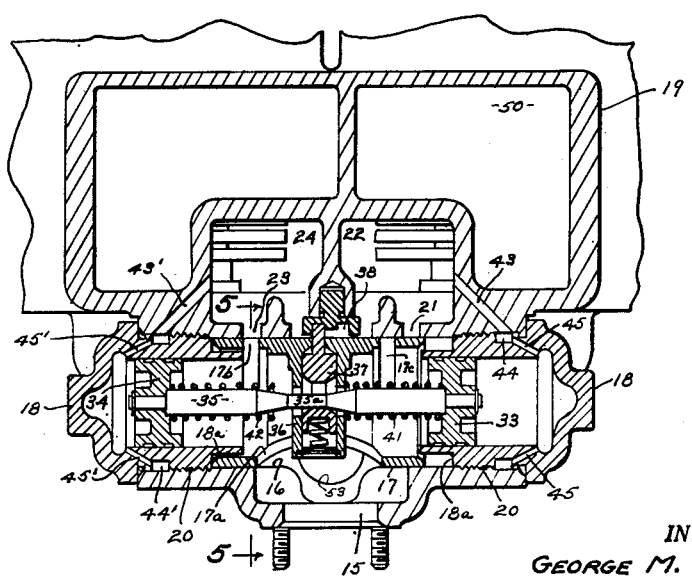
Fig. 7 is a view of the lower portion of Fig. 6 showing another position of the parts.

In the device of Figs. 1 to 7 inclusive, the fuel inlet at 15 leads into a generally cylindrical chamber 16, in which a sleeve valve 17 is reciprocable with slight movement. The opposite ends of chamber 16 are closed by means of the hollow plugs 18 which are threaded into valve body 19 at 20. These plugs have inwardly facing annular shoulders 18a which provide space for the reciprocation of valve 17 and also provide limits for its endwise movement. The valve 17 is provided with an inlet port 17a and two outlet ports 17b and 17c. In the position of the parts shown in Fig. 6, the port 17c registers with a port 21 leading into a filter chamber 22, while the port 17b is closed against access to port 23 leading into filter chamber 24. It will be understood that filter chambers 22 and 24 are entirely separated from each other. In Fig. 7, sleeve valve 17 has reversed the condition of the ports by moving to the left from the position shown in Fig. 6. In Fig. 7, port 17b registers with port 23 leading into chamber 24 while port 17c is closed against communication with port 21 leading into chamber 22.

The mounting of the filter elements in the chambers 22 and 24 is identical and the construction will be understood by reference to Fig. 2. The chamber is cup-shape and open at the top and has a generally cylindrical side wall. The top is closed by a cap 25 held in place by stud bolts 26 and properly sealed against leakage. In the central portion of the bottom wall an opening is provided into which is threaded a perforated tube 27. The filter elements 28 are mounted on this tube 27. It will be understood that various types of filter element might be used in this location but I have chosen to show elements constructed according to U. S. Patent 2,423,547, granted July 8, 1947, to Robert A. Behlen. Each of the elements 28 is annular hollow filter leaf having very fine filtering openings on the upper and lower surfaces of the leaf and the hollow center of the leaf communicating with the perforations in the tube 27. A suitable number of these filter elements are assembled on the tube 27 with proper spaces between them, after which the top of the tube is closed by means of a cap 29 held in place by a nut 30. The discharge of clean fluid from the lower end of tube 27 flows into a passageway 31 which communicates with a discharge outlet passageway 32 which is common to the discharge from the filters in chambers 22 and 24.

Differential pressure means is provided for automatically shifting the sleeve valve 17 from one of its operative positions to the other upon sufficient clogging of the filter element in use. This will be most clearly understood with reference to Figs. 6 and 7. Pistons 33 and 34 are provided respectively opposite the ends of the sleeve valve 17. Each cylinder reciprocates in the hollow cylindrical center of one of the caps 18. A piston rod 35 rigidly connects these pistons together as they move back and forth. Extending laterally across the central portion of valve 17 is a hollow partition 36. This partition has openings 36a through which piston rod 35 passes freely. In the hollow of the partition is slidably mounted a detent body 37 which has a nose 37a which enters into a recess 38 in Fig. 6 or 39 in Fig. 7 to hold valve 17 in one or the other of its operative positions. It will be noted that sharp shoulders are provided where the detent leaves each of these recesses for movement in the opposite direction. An opening 37b is provided in the body of the detent for passage of the piston rod 35.

Means is provided between the piston rod 35 and the detent 37 for camming the detent nose 37a out of one of its receiving recesses upon movement of the piston assembly relative to the valve 17. In the form here shown, the central portion of the piston rod 35 is somewhat narrower at 35a and connected by truncated cone portions 35b and 35c with the portions of greater diameter. These truncated cone portions act as cams against the walls of the opening 37b so as to move the detent downwardly from the level of Fig. 7 to the level of Fig. 6 as the piston rod 35b moves through the opening 37b. A small spring 40 normally urges the detent upwardly. Helical springs 41 and 42 surround the piston rod 35 lying respectively between pistons 33 and 34 and the central partition 36.

It will be noted in Figs. 6 and 7 that the inner faces of pistons 33 and 34 are subject to the same pressure, namely the inlet pressure entering at the inlet 15. Any differential, therefore, tending to move the piston assembly in one direction or the other will be determined by the pressures exerted against the outer faces of pistons 33 and 34. On the outer face of piston 33, the pressure will be substantially equal to the pressure at the inlet 15 because of the passageway 43 through the valve body communicating with an annular passageway 44 which in turn communicates through passageway 45 with the hollow of cap 18 on the right hand side of piston 33 in Fig. 6. Similar passageways bearing the prime suffix provide communication from chamber 24 to the left hand face of piston 34. It has been noted that in the position of the parts in Fig. 6, the chamber 24 is cut off from communication with the inlet 15. It has been pointed out that the discharge end of each of the chambers 22 and 24 are in communication through the passageways 31 and 32. With the parts in the position of Fig. 6, the filter element in chamber 22 continues to become more and more dirty or clogged up resulting in a differential pressure drop across the filter element in use. This means that the pressure at the discharge side of the filter element in chamber 22 (as measured in passageway 31) will continue to drop. This pressure is transmitted through the static fluid in chamber 24 through passageways 43', 44' and 45' to the left hand face of piston 34. The pressure against the right hand face of piston 33 continues to be the high pressure at the inlet 15. Thus, the piston assembly continues to be moved toward the left as shown in Fig. 6 and, as the lost motion is taken up between the piston assembly and the sleeve valve 17, spring 41 is compressed against the partition 36 and the nose 37a of the detent is gradually cammed downwardly by the frusto-conical portion 35b of the piston rod 35. In the position of the parts in Fig. 6, this action has been going on until the detent is just about to be released from the recess 38. In the position of the parts in Fig. 7, the detent nose 37a has been released from the recess 38, thus permitting the spring 41 to snap the valve 17 from the position of Fig. 6 to the position of Fig. 7. This movement is limited by the end of the valve striking one of the shoulders 18a. The parts are now reversed so that the active filter element is in chamber 24 and the static filter element is in chamber 22.

The above described operation of the device may be more clearly understood from the diagrammatic showing in Fig. 8. Here each of the parts previously referred to is given the same number with a zero suffix. The dirty fuel enters at the inlet 150. It then passes through the sleeve valve 170 and then through the port 170c into the chamber 220. The dirty fluid is filtered through the hollow leaves 280 passing out the perforated tube 270 into the outlet passageway 310 and the discharge 320. The pressure communicated through passageway 450 to the right hand face of piston 330 will always be substantially equal to the inlet pressure. As the pressure drops in the passageway 310 it is communicated back through the static fluid in chamber 240 and this gradually lowered pressure is transmitted through passageway 450' to the left hand face of piston 340. Thus, gradually the higher pressure on the right hand face of piston 33 will overcome the lower pressure on the left hand face of piston 34 as viewed in Fig. 8 until the valve 17 is shifted toward the left as viewed in Fig. 8 thus cutting off the filter in chamber 22 and putting the filter in chamber 24 on the line.

Means is provided for cleaning the filter which is not in active use. Obviously, various automatic cleaning arrangements could be provided depending on the nature of the cleaning job necessary to be done. In the present case, the filter is designed to remove ice crystals forming in airplane fuel at high altitudes. Therefore, the only cleaning provided in the present invention has to do with a steam jacket surrounding the chambers 22 and 24. Referring to Figs. 1 to 4 inclusive, the steam inlet is shown at 46 whence it passes through the annular passageway 47 around the chamber 24, then through a crossover passageway 48 separated from the steam inlet by a partition 49, thence around an annular passageway 50 surrounding chamber 22 to the outlet 51 which is separated from the inlet by a partition 52. Instead of steam entering at 46 and discharging at 51, any other suitable heating fluid could be used. For instance, in connection with jet airplane engines, heated air from the air compressor is utilized for this purpose. In this use of my device, it has been found unnecessary to change the flow of this heated fluid through the jacket. It remains effective at all times and is sufficient to heat up and melt the ice crystals in that one of chambers 22 and 24 in which the flow is quiescent. The effect of the heated jacket on the fuel flowing through that chamber wherein the filter element is in use, is very slight due to the great volume of fuel compared with the effect of the heating jacket.

In order to insure a flow of fuel to the engine at all times, the valve port openings 17b and 17c are so arranged that a portion of the openings 21 and 23 are always available for fluid flow. In other words, neither chamber 22 nor 24 can be cut off the line until the other chamber is open to flow.

Means is provided to get fluid to the engine in case anything should happen to the reversal of valve 17 or in case excessive pressure builds up through either one of the filter elements. To this end, a by-pass is provided as shown in Fig. 4. An opening 53 is provided through a partition wall of housing 19 providing communication from a zone near the inlet 15 to the outlet passageway 32. This opening is normally closed by a valve 54, urged to closed position by a helical spring 55 surrounding the valve stem guide 56. The entire assembly is held in position by cap 57. The spring 55 is so chosen that upon excessive pressure being built up at the inlet 15, the valve 54 will be forced open permitting the flow of fuel from the inlet 15 to the outlet 32. This will provide dirty fuel to the engine but this is preferable to no fuel at all.

The modification shown in Fig. 9 is similar in all respects to that described in connection with Figs. 1 to 8 inclusive except that the flow of fuel is reversed and the sleeve valve 17 is on the clean side of the filter elements instead of on the dirty side thereof. Referring to Fig. 9, the dirty fuel enters at 58 and passes either through chamber 59 or chamber 60. The filter elements 27, 28 in these chambers are exactly like those already described. Downstream from each element is a chamber 61 or 62 communicating respectively with ports 63 or 64. The valve 17 and its differential pressure operating mechanism including pistons 33 and 34 connected by piston rod 35 and urged by springs 41 and 42, together with the detent 37, 37a and its action are all exactly like those already described.

In the position of the parts shown in Fig. 9, port 17c of the sleeve valve is aligned with port 63 so that the filter element in chamber 59 is on the line. Port 17b is out of line with the port 64 so that the fluid in chamber 60 is static. The filter element 27, 28 in each of the chambers is like that already described. As the filter element in chamber 59 becomes clogged, there is a greater pressure differential between inlet 58 and chamber 61. The low pressure from chamber 61 is transmitted through line 65 and passageways 66 to the left hand face of piston 34. Meanwhile, the inlet pressure at 58 is transmitted through the static fluid in chamber 60 to chamber 62 and is transmitted through line 67 and passageway 68 to the right hand face of piston 33. Thus greater pressure builds up at the right hand face of piston 33 than on the left hand face of piston 34, while the inner faces of each of these pistons are subjected to the same pressure, namely the pressure at the outlet 69. The differential pressure mechanism will therefore move to the left as viewed in Fig. 9 until spring 41 is loaded and the frusto-conical portion 35b of the piston rod cams the detent nose 37a out of its holding recess. The valve 17 will then be snapped toward the left as viewed in Fig. 9 until it comes to rest against the shoulder 70 with the port 17b aligned with port 64 and with the valve 17 closing the port 63. This puts the filter element in chamber 60 on the line while chamber 59 becomes static. It is understood that the device of Fig. 9 is provided with means for cleaning the filter which is off the line, such as the heated jacket described at 46, 47, 48, 50, 51 in the first modification described.

In Figs. 10 and 11 I have shown another form of detent which need not be positively cammed out of the way as shown in connection with detent 37 of the first described form. It should be understood that all other parts in connection with Figs. 10 and 11 are exactly like those shown in Figs. 1 to 7 inclusive. The valve 17' differs from valve 17 only in that it is provided with a single central partition 71 having an opening through which the piston rod 35' moves freely, and against which the springs 41' and 42' press in order to snap the valve 17' from one of its positions to the other. In the outer wall of the valve 17' are provided two slight recesses 72 and 73. A ball detent 74 is adapted to rest in one of these recesses and is pressed into the recess by a spring 75 held in a suitable pocket in a partition of the housing 19'.

The operation of the modification shown in Figs. 10 and 11 should now be clearly understood. With the parts in the position shown in Fig. 11, the filter element in chamber 24 is on the line since ports 17b and 23 coincide. Chamber 22 is cut off the line because the port 17c is out of line with the port 21. The high pressure from the inlet 15 is effective through chamber 24, passageway 43' and the other parts shown in Figs. 6 and 7 against the left hand face of piston 34. As the filter element in chamber 24 becomes dirty, the lower pressure at the outlet side of this filter is communicated back through the static fluid in chamber 22 and through passageway 43 and the other parts previously described to the right hand face of piston 33. This is a lower pressure than is effective upon the left hand face of piston 34, whereupon the piston mechanism moves toward the right as viewed in Fig. 11 until spring 42' is compressed and exerts sufficient pressure against the partition 71 of valve 17' to overcome the pressure of spring 75 urging the ball 74 into the recess 72. Thereupon, the spring 42' snaps the valve 17' toward the right as viewed in Fig. 11 until it is stopped by shoulder 76 with port 17c aligned with port 21 and with port 23 closed off. This reverses the flow through chambers 22 and 24 and the apparatus is set for another cycle.

What I claim is:

1. In a dual filter, a housing having two separate chambers, each chamber having a liquid inlet port and a liquid outlet port thus providing a pair of inlet ports and a pair of outlet ports, a filter element in each chamber, each element having dirty and clean sides communicating respectively with the inlet and outlet ports of its associated chamber, valve means for coincidentally closing one port of one pair and opening the other port of said one pair, whereby the filter element in the chamber with the open port is in use, said ports of said one pair opening into a cylindrical chamber, said valve means comprising a sleeve valve reciprocable in said chamber, differential pressure means operatively associated with said sleeve valve to shift the latter to reverse the closed and open condition of said ports of one pair, said differential pressure means comprising two pistons, one opposite each end of said sleeve valve and reciprocable in a cylinder, a piston rod connecting said pistons, said pistons having their inner faces subjected to the same pressure and having their outer faces subjected to higher and lower pressures respectively to move said sleeve valve in said port reversing direction, a communicating passageway connecting the other pair of said ports, a passageway for communicating the fluid pressure at the outlet port of the chamber with the filter element in use to said lower pressure face of said differential pressure means, a passageway for communicating the inlet port pressure to said higher pressure face of said differential pressure means, central hollow partition means in said sleeve valve, separate spring means between each piston and said partition means, one of said spring means being loaded by movement of said pistons in one direction relative to said sleeve valve, the other of said spring means being loaded by movement of said pistons in the opposite direction, and reciprocating detent means slidably mounted in said partition for holding said sleeve valve until one of said spring means is loaded.

2. The combination of claim 1 including operative connections between said detent means and said piston rod for releasing said detent means by movement of said pistons and piston rod relative to said sleeve valve.

3. In a dual filter, a housing having two separate chambers, each chamber having a liquid inlet port and a liquid outlet port thus providing a pair of inlet ports and a pair of outlet ports, a filter element in each chamber, each element having dirty and clean sides communicating respectively with the inlet and outlet ports of its associated chamber, valve means for coincidentally closing one port of one pair and opening the other port of said one pair, whereby the filter element in the chamber with the open port is in use, said ports of said one pair opening into a cylindrical chamber, said valve means comprising a valve reciprocable in said cylindrical chamber, differential pressure means operatively associated with said valve means to shift the latter to reverse the closed and open condition of said ports of one pair, said differential pressure means comprising two spaced movable abutments in said cylindrical chamber, said abutments being on opposite sides of said valve means, a rigid rod connecting said movable abutments, said abutments having inner and outer pairs of faces, said abutments having one of said pair of faces subjected to the same pressure and having the other of said pair of faces subjected to higher and lower pressures respectively to move said valve means in said port reversing direction, a communicating passageway connecting the other pair of said ports, a passageway communicating the fluid pressure at the outlet port of the chamber with the filter element in use to said lower pressure face of said differential pressure means, a passageway communicating the inlet port pressure to said higher pressure face of said differential pressure means, separate spring means between each abutment and its adjacent end of said valve means, one of said spring means being loaded by movement of said abutments in one direction relative to said valve, the other of said spring means being loaded by movement of said pistons in the opposite direction, and releasable detent means for holding said valve means until one of said spring means is loaded.

References Cited in the file of this patent

UNITED STATES PATENTS

| Number | Name | Date |
|---|---|---|
| 1,920,003 | Chenault | July 25, 1933 |
| 2,434,427 | Muller | Jan. 13, 1948 |
| 2,473,032 | Le Clair | June 14, 1949 |
| 2,492,704 | Lenzt | Dec. 27, 1949 |
| 2,540,300 | Smith | Feb. 6, 1951 |